United States Patent
Mc Lain et al.

(10) Patent No.: US 7,404,315 B2
(45) Date of Patent: Jul. 29, 2008

(54) ENGINE IDLE PERFORMANCE FAULT SOURCE CONTROL SYSTEM

(75) Inventors: Kurt D. Mc Lain, Clarkston, MI (US); Wenbo Wang, Novi, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 249 days.

(21) Appl. No.: 11/285,583

(22) Filed: Nov. 21, 2005

(65) Prior Publication Data

US 2007/0113632 A1    May 24, 2007

(51) Int. Cl.
*G01M 15/00* (2006.01)
(52) U.S. Cl. .................................... 73/118.1; 73/117.3
(58) Field of Classification Search ......... 73/116–118.1
See application file for complete search history.

(56) References Cited

U.S. PATENT DOCUMENTS

| | | | | |
|---|---|---|---|---|
| 3,948,228 | A * | 4/1976 | Luchaco | 123/688 |
| 4,597,368 | A * | 7/1986 | Ament | 123/339.2 |
| 5,485,820 | A * | 1/1996 | Iwaszkiewicz | 123/458 |
| 5,894,828 | A * | 4/1999 | Sivashankar et al. | 123/339.12 |
| 5,947,079 | A * | 9/1999 | Sivashankar et al. | 123/295 |
| 5,975,048 | A * | 11/1999 | Sivashankar et al. | 123/339.12 |
| 7,171,943 | B1 * | 2/2007 | Wada et al. | 123/348 |
| 7,275,426 | B2 * | 10/2007 | Lahti et al. | 73/118.1 |

\* cited by examiner

*Primary Examiner*—Eric S. McCall
*Assistant Examiner*—Jermaine Jenkins

(57) ABSTRACT

An engine idle fault control system that identifies a source of rough idle in an engine includes a first module that monitors an idle speed of the engine and that generates a rough idle signal, and a second module that monitors a fuel control parameter. A third module determines a source of rough idle based on the fuel control parameter and the rough idle signal.

25 Claims, 3 Drawing Sheets

ENGINE IDLE PERFORMANCE FAULT SOURCE CONTROL SYSTEM

FIELD OF THE INVENTION

The present invention relates to internal combustion engines, and more particularly to an engine idle fault detection control system.

BACKGROUND OF THE INVENTION

Internal combustion engines combust a fuel and air mixture within cylinders driving pistons to produce drive torque. The engine drives a transmission through a coupling device. The engine also drives other loads including, but not limited to, an alternator, a plurality of pumps (e.g., oil and coolant) and an A/C compressor. The engine is operated based on a desired air-to-fuel (A/F) ratio. In some instances, the A/F ratio is lean (i.e., reduced fuel) and in other instances, the A/F ratio is rich (i.e., increased fuel). An ignition system initiates combustion of the A/F mixture within cylinders.

During vehicle operation, periods of engine idle occur. Engine idle occurs when the vehicle is at or near zero speed and there is no operator throttle input (i.e., operator not revving the engine). During engine idle, rough idle can occur, whereby the engine speed bounces or drops below a threshold level, resulting in engine stall. Rough idle detracts from vehicle quality and customer satisfaction.

In traditional vehicle systems, low idle and high idle diagnostics have been implemented. These idle diagnostics, however, only check the length of time at which an engine idle speed is above or below high and low idle speed thresholds, respectively, and fail to identify the root cause of the rough idle condition.

SUMMARY OF THE INVENTION

Accordingly, the present invention provides an engine idle fault control system that identifies a source of rough idle in an engine. The engine idle fault control system includes a first module that monitors an idle speed of the engine and that generates a rough idle signal, and a second module that monitors a fuel control parameter. A third module determines a source of rough idle based on the fuel control parameter and the rough idle signal.

In another feature, the third module sets a source flag based on the source of rough idle.

In another feature, the third module determines the source to be an ignition failure when the fuel control parameter is less than a threshold parameter and the engine idle speed is decreasing.

In other features, the third module determines the source to be an excess load on the engine when the fuel control parameter varies and the engine idle speed is bouncing. The third module determines the source to be the excess load when the fuel control parameter varies, the engine idle speed is bouncing and a mass air flow (MAF) into the engine is greater than a threshold MAF.

In still other features, the engine idle fault control system further includes a fourth module that monitors an oxygen sensor signal (OSS). The third module determines the source to be a fuel lean condition when the fuel control parameter is greater than a threshold parameter, the engine idle speed is bouncing and the OSS is less than a threshold OSS. The third module determines the source to be a fuel rich condition when the fuel control parameter is less than a threshold parameter, the engine idle speed is bouncing and the OSS is greater than a threshold OSS.

In yet another feature, the fuel control parameter is a fuel control long-term multiplier (LTM).

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
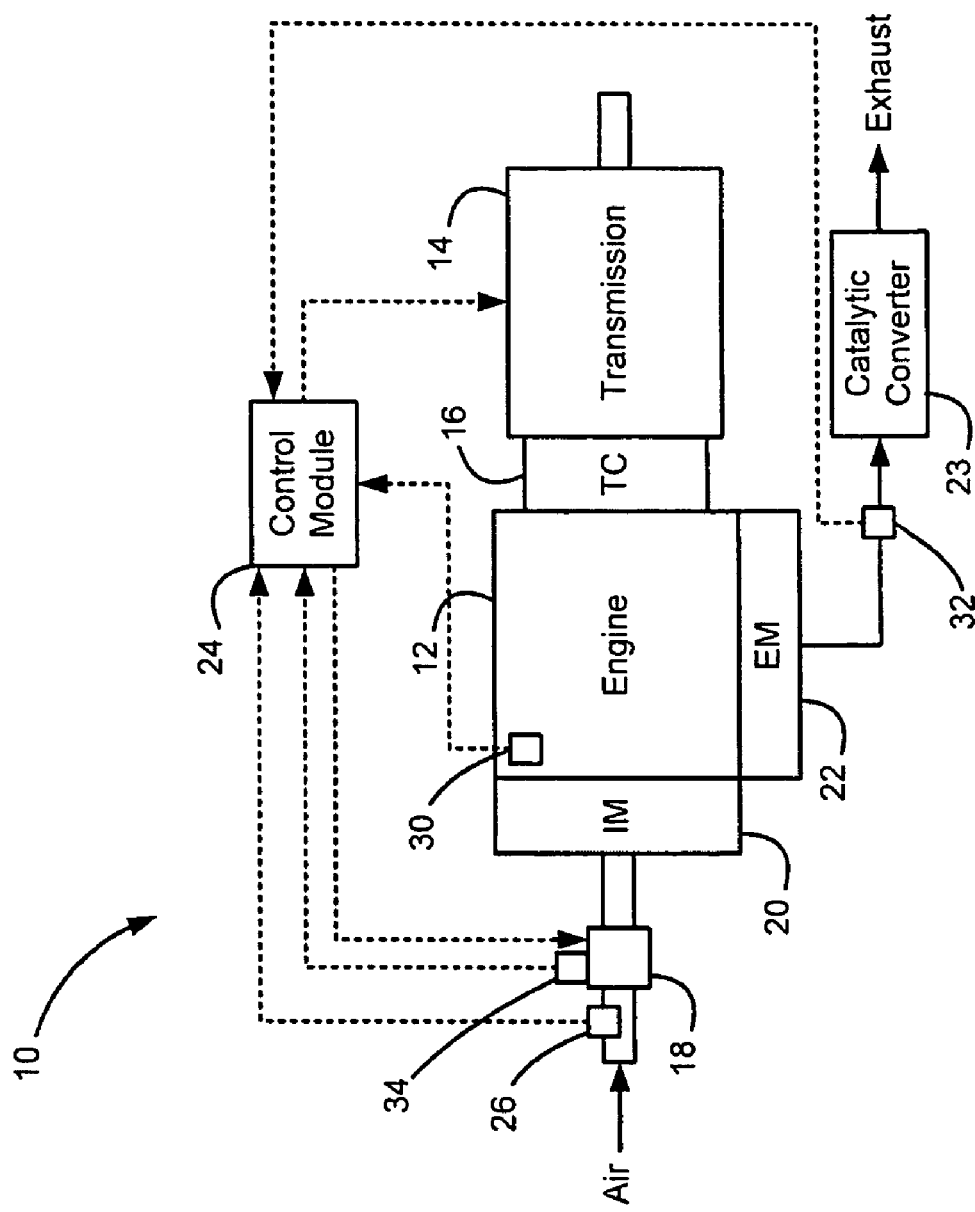
FIG. 1 is a functional block diagram of an exemplary vehicle system.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an exemplary vehicle system 10 is illustrated. The vehicle system includes an engine 12 that drives a transmission 14 through a torque converter 16. More specifically, air is drawn through a throttle 18 into an intake manifold 20, which distributes air to cylinders (not shown). The air is mixed with fuel at a desired air-to-fuel (A/F) ratio and the A/F mixture is combusted within the cylinders to generate drive torque. The combustion products are exhausted from the engine 12 through an exhaust manifold 22 and are treated in a catalytic converter 23 before being released to atmosphere.

A control module 24 regulates operation of the engine 12 based on various engine operating parameters. A mass air flow (MAF) sensor generates a MAF signal based on the MAF into the engine 12. An engine RPM sensor 30 generates an RPM signal based on the rotational velocity of a crankshaft (not shown) of the engine 12. A front or pre-catalyst oxygen sensor 32 generates an oxygen sensor signal (OSS) based on an oxygen content of the exhaust flowing from the engine 12. A throttle position sensor 34 generates a throttle position signal (TPS) indicative of a driver's throttle input. The control module 24 regulates the A/F ratio based on a long-term multiplier (LTM). More specifically, the LTM is an adjustment factor that is applied to the fueling rate. The LTM is initially at a neutral value (e.g., 128) and is adjusted up or down based on the OSS during closed-loop fuel control. Over time, the LTM settles at a value that provides a desired A/F ratio based on the fueling rate determined from a look-up table.

The engine idle fault detection control system of the present invention monitors engine RPM at idle. The engine is at idle if the throttle position (TPS) or throttle area are less than respective thresholds (i.e., no driver pedal input) and the vehicle speed is below a threshold vehicle speed (i.e., the vehicle is not moving). If the engine RPM falls below a threshold RPM ($RPM_{THR}$), the engine idle fault detection control system determines the source of the fault based on engine operating parameters and initiates remedial action based on the fault source. The engine operating parameters include, but are not limited to, a stall saver flag ($FLAG_{SS}$), engine RPM, the front OSS, the LTM used for fuel control, MAF and TPS. The fault sources include, but are not limited to, the A/F ratio being lean (i.e., fuel lean), the A/F ratio being rich (i.e., fuel rich), ignition failure and excess load on the engine.

$FLAG_{SS}$ is set and/or reset based on engine RPM. It is appreciated, however, that other, more complicated logic may be used. If the engine RPM falls below $RPM_{THR}$ (e.g., 475 RPM), $FLAG_{SS}$ is immediately set to True. Once True, $FLAG_{SS}$ remains True even though the engine RPM may increase over $RPM_{THR}$. $FLAG_{SS}$ is reset to False if the engine RPM remains greater than $RPM_{THR}$ for a threshold time or a threshold counter (e.g., X number of samples of a sample counter or a delay time ($t_{DELAY}$) expires). If $FLAG_{SS}$ is not reset to False, the stall saver is active and the engine idle fault control continues to determine the fault source.

In determining the fault source, the engine idle fault control determines whether the LTM is greater than a high LTM threshold ($LTM_{THRHI}$). More specifically, a moving average of the LTM ($LTM_{AVG}$) (e.g., 25 samples of a 12.5 ms sample loop). If the moving average of the LTM is greater than $LTM_{THR}$ (e.g., 101%), the LTM is high. The LTM can be considered reset to not high if the averaged LTM is less than $LTM_{THRHI}$ for a threshold time or threshold counter. The engine idle fault control also determines whether the LTM is low (LO). If the moving average LTM is less than a LTM low limit ($LTM_{THRLO}$) (e.g., 79%), the LTM is LO. The LTM is considered reset to un-low when the averaged LTM is greater than $LTM_{THRLO}$ for a threshold time or a threshold counter. The moving averaged LTM is considered non-HI and non-LO (i.e., within a MID range) if it remains between $LTM_{THRLO}$ and $LTM_{THRHI}$ during engine idle.

The engine idle fault control also determines whether the front OSS is HI or LO. More specifically, if the moving averaged front OSS is greater than a high OSS threshold ($OSS_{THRHI}$) (e.g., 750 mV), the front OSS is HI. The front OSS is considered reset to un-high if the averaged front OSS is less than $OSS_{THRHI}$ for a threshold time or threshold counter. If the moving averaged front OSS is less than a threshold low OSS ($OSS_{THRLO}$) (e.g., 75 mV), the front OSS is LO. The front OSS is considered reset to un-low if the averaged front OSS is greater than $OSS_{THRLO}$ for a threshold time or threshold counter. The moving averaged OSS is considered non-HI and non-LO (i.e., within a MID range) if it remains between $OSS_{THRLO}$ and $OSS_{THRHI}$ during engine idle.

The engine idle fault control further monitors the engine RPM LO/HI variation. More specifically, if $FLAG_{SS}$ is True and the engine RPM is greater than a variation RPM threshold ($RPM_{VARTHR}$) (e.g., 900 RPM), the engine RPM is bouncing and is considered unstable. If, however, the engine RPM remains greater than $RPM_{VARTHR}$ for a threshold time or threshold counter, the RPM is again considered stable. The engine idle fault control also determines whether the engine RPM is decreasing. More specifically, if $FLAG_{SS}$ is True and the moving averaged engine RPM (e.g., 50 sample moving average) decreases or decelerates (e.g., $dRPM_{AVG}/dt<0$), decreasing engine RPM is detected.

The MAF is also monitored to determine whether the MAF is considered HI. More specifically, when the engine RPM is less than $RPM_{THR}$, the MAF at that point is stored as an initial value ($MAF_{INT}$). While the engine RPM is less than $RPM_{THR}$, a difference between MAF and $MAF_{INT}$ is calculated ($\Delta MAF$). $\Delta MAF$ is compared to a threshold difference ($\Delta MAF_{THR}$) (e.g., 7 g/s). If $\Delta MAF$ is greater than $\Delta MAF_{THR}$, the MAF is considered HI.

The engine idle fault control determines the fault source as summarized in the following table:

TABLE 1

| Fault Source | $FLAG_{SS}$ | RPM | OSS | LTM | MAF |
| --- | --- | --- | --- | --- | --- |
| Fuel Lean | True | Unstable | LO | HI | — |
| Fuel Rich | True | Unstable | HI | LO | — |
| Ignition Fail | True | Decreasing | LO | LO | — |
| Excess Load | True | Unstable | HI | Varied | HI |

The fault source is a lean A/F ratio if $FLAG_{SS}$ is True, the engine RPM is unstable, the front OSS is LO and the LTM is HI. The fault source is a rich A/F ratio if $FLAG_{SS}$ is True, the engine RPM is unstable, the front OSS is HI and the LTM is LO. Ignition failure is the fault source if $FLAG_{SS}$ is True, the engine RPM is decreasing, the front OSS is LO and the LTM is LO. The fault source is an excess load on the engine if the $FLAG_{SS}$ is True, the engine RPM is unstable, the front OSS is HI, the LTM is varied and the MAF is HI.

Figure 2:
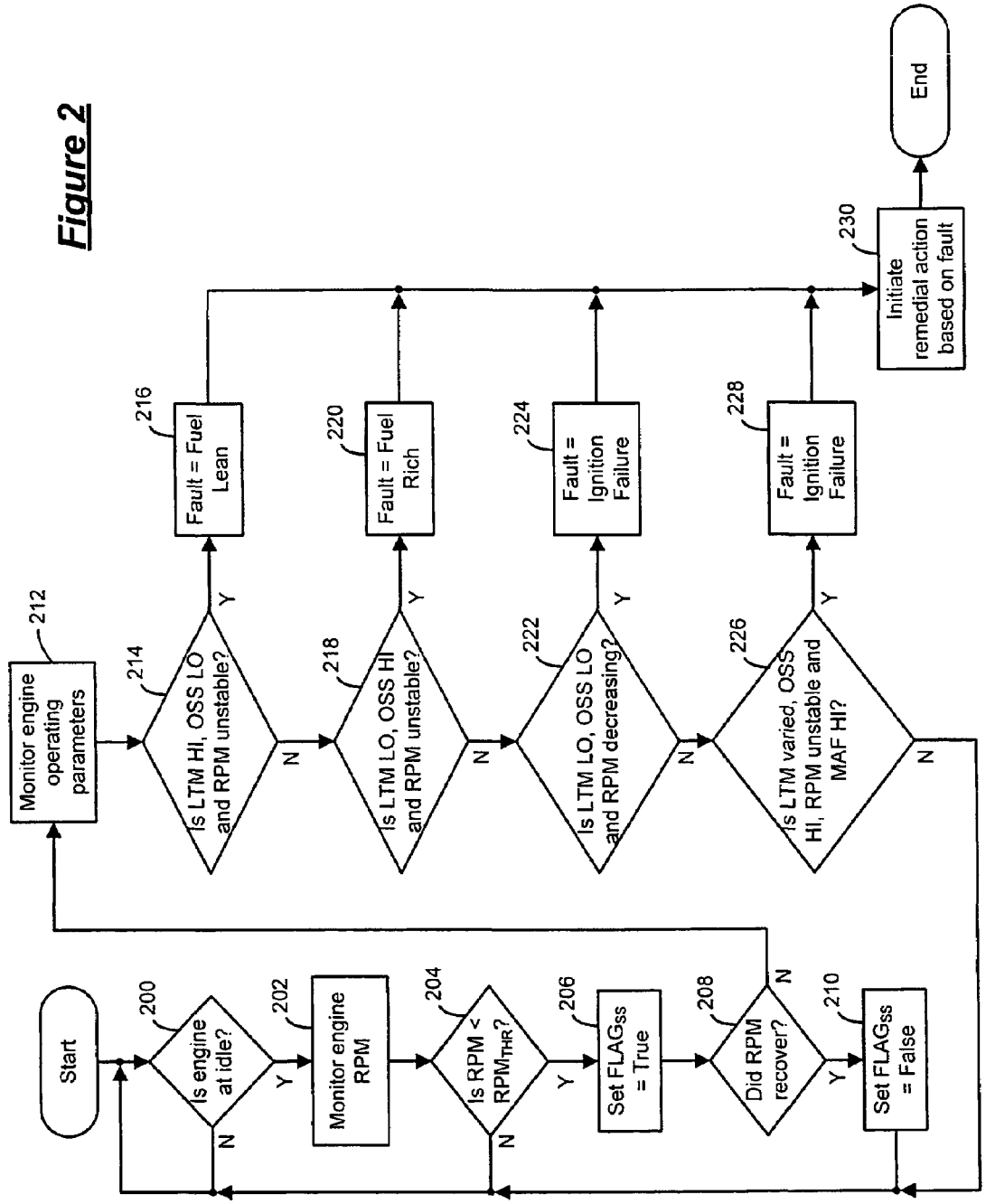
FIG. 2 is a flowchart illustrating exemplary steps executed by the engine idle fault detection control according to the present invention.

Referring now to FIG. 2, exemplary steps executed by the engine idle fault control will be discussed in detail. In step 200, control determines whether the engine is at idle (i.e., no throttle input and the vehicle not moving). If the engine is not at idle, control loops back. If the engine is at idle, control monitors the engine RPM in step 202. In step 204, control determines whether the engine RPM falls below $RPM_{THR}$. If the engine RPM does not fall below $RPM_{THR}$, control loops back to step 200. If the engine RPM falls below $RPM_{THR}$, control continues in step 206.

In step 206, control sets $FLAG_{SS}$ equal to True. In step 208, control determines whether the engine RPM recovers (i.e., is the engine RPM greater than $RPM_{THR}$ for a threshold time or threshold counter). If the engine RPM recovers, control sets $FLAG_{SS}$ equal to False in step 210 and control loops back to step 200. If the engine RPM does not recover, control monitors engine operating parameters in step 212.

In step 214, control determines whether the LTM is HI, the front OSS is LO and the engine RPM is unstable. If the LTM is HI, the front OSS is LO and the engine RPM is unstable, control identifies the fault source as a lean A/F ratio in step 216. If the LTM is not HI, the front OSS is not LO or the engine RPM is stable, control determines whether the LTM is LO, the front OSS is HI and the engine RPM is unstable in step 218. If the LTM is LO, the front OSS is HI and the engine RPM is unstable, control identifies the fault source as a rich A/F ratio in step 220. If the LTM is not LO, the front OSS is not HI or the engine RPM is stable, control continues in step 222.

In step 222, control determines whether the LTM is LO, the front OSS is LO and the engine RPM is decreasing. If the LTM is LO, the front OSS is LO and the engine RPM is decreasing, control identifies the fault source as ignition failure in step 224. If the LTM is not LO, the front OSS is not LO or the engine RPM is not decreasing, control determines whether the LTM is varied, the front OSS is HI and the engine RPM is unstable in step 226. If the LTM is varied, the front OSS is HI and the engine RPM is unstable, control identifies the fault source as an ignition failure in step 228. If the LTM is not varied, the front OSS is not HI or the engine RPM is stable, control loops back to step 200. After control identifies the fault source in steps 216, 220, 224 and 228, control initiates remedial action based on the fault source in step 230 and control ends. Exemplary remedial actions include, but are not limited to, increasing fuel to the engine, decreasing fuel to the engine, adjusting the load on the engine (e.g., reducing alternator load) and engine shut-down. Another exemplary remedial action includes setting a service flag that indicates the fault source. In this manner, a service technician can readily identify and repair the fault during a service procedure.

Figure 3:
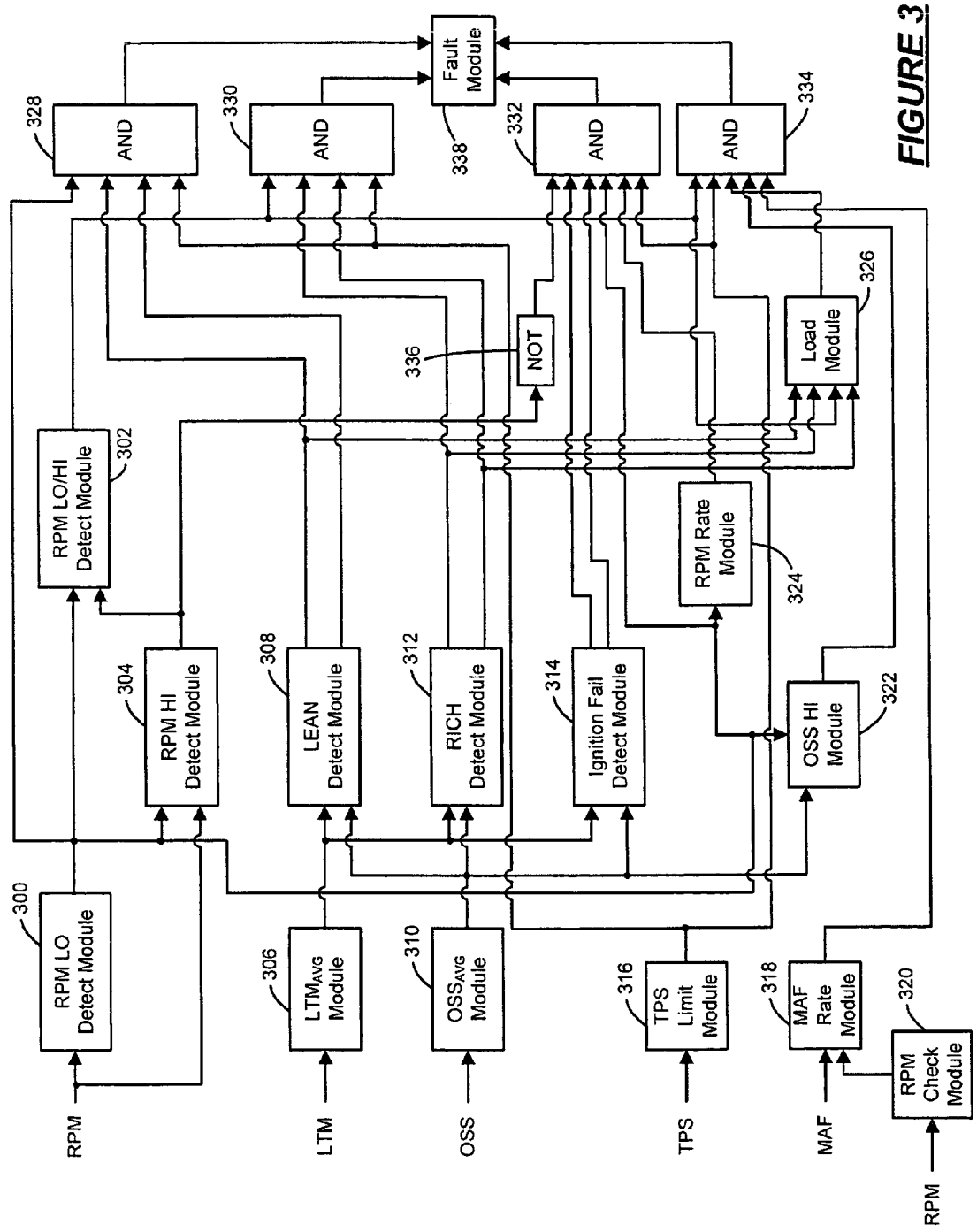
FIG. 3 is a functional block diagram illustrating exemplary modules that execute the engine idle fault detection control of the present invention.

Referring now to FIG. 3, exemplary modules that execute the engine idle fault control are illustrated. The exemplary modules include an RPM LO detect module 300, an RPM LO/HI detect module 302, an RPM HI detect module 304, an $LTM_{AVG}$ module 306, a lean detect module 308 and an $OSS_{AVG}$ module 310. The exemplary modules further include a rich detect module 312, an ignition failure detect module 314, a TPS limit module 316, a MAF rate detect module 318, an RPM check module 320, an OSS HI detect module 322, an RPM rate module 324 and a load module 326. A plurality of AND gates 328, 330, 332 and 334, respectively are provided, as well as a NOT gate or inverter 336. A fault module 338 receives outputs from the AND gates 328, 330, 332, 334 and initiates remedial action based on the fault source.

The RPM LO detect module 300 sets $FLAG_{SS}$ to True or False based on the engine RPM. The output of the RPM LO detect module 300 is a binary output (i.e., 0 or 1) based on whether $FLAG_{SS}$ is True (e.g., 1) or False (e.g., 0). The RPM LO/HI detect module 302 determines whether the engine RPM is bouncing or stable based on the output of the RPM LO detect module 300 and the output of the RPM HI detect module 304. The RPM LO/HI detect module 302 generates a binary signal based on whether the. engine RPM is unstable (e.g., 1) or is stable (e.g., 0). The output of the RPM LO/HI detect module 302 is provided to the AND gates 300, 334 and the load module 326. The RPM Hi detect module 304 determines whether the engine RPM is HI based on the engine RPM and the output of the RPM LO detect module 300. The RPM HI detect module 304 generates a binary signal based on whether the engine RPM is HI (e.g., 1) or is not HI (e.g., 0). The output of the RPM HI detect module 304 is provided to the RPM LO/HI detect module 302 and the NOT gate 336.

The $LTM_{AVG}$ module 306 calculates the moving averaged LTM. $LTM_{AVG}$ is output to the lean detect module 308, the rich detect module 312 and the ignition failure detect module 314. The $OSS_{AVG}$ module 310 calculates the moving averaged OSS. $OSS_{AVG}$ is output to the lean detect module 308, the rich detect module 312, the ignition failure detect module 314 and the OSS HI detect module 322. The TPS limit module 316 determines whether there is any throttle input from the driver. The TPS limit module 316 generates a binary signal based on whether there is driver input (e.g., 0) or there is no driver input (e.g., 1). The output of the TPS limit module 316 is provided to each of the AND gates 328, 330, 332 and 334.

The RPM check module 320 determines whether the engine RPM is below a threshold RPM (e.g., 500 RPM). The RPM check module 320 generates a binary signal based on whether the engine RPM is less than the RPM threshold (e.g., 1) or is greater than RPM threshold (e.g., 0). The MAF rate detect module 318 determines whether MAF is increasing over $MAF_{INT}$. The MAF rate detect module 318 generates a binary signal based on whether MAF increases a threshold amount over $MAF_{INT}$ (e.g., 1) or does not increase the threshold amount over $MAF_{INT}$ (e.g., 0). The output of the MAF rate detect module 318 is provided to the AND gate 334.

The lean detect module 308 determines whether the LTM is HI and whether the OSS is LO based on the output of the $LTM_{AVG}$ module 306 and the $OSS_{AVG}$ module 310. The lean detect module 308 generates a first binary signal based on whether $LTM_{AVG}$ is HI (e.g., 1) or the $LTM_{AVG}$ is not HI (e.g., 0). The lean detect module 308 generates a second binary signal based on whether $OSS_{AVG}$ is LO (e.g., 1) or the $OSS_{AVG}$ is not LO (e.g., 0). The first output is provided to the AND gate 328 and the load module 326. The second output is provided to the AND gate 328.

The rich detect module 312 determines whether the LTM is LO and whether the OSS is HI based on the output of the $LTM_{AVG}$ module 306 and the $OSS_{AVG}$ module 310. The rich detect module 312 generates a first binary signal based on whether $LTM_{AVG}$ is LO (e.g., 1) or the $LTM_{AVG}$ is not LO (e.g., 0). The rich detect module 312 generates a second binary signal based on whether $OSS_{AVG}$ is HI (e.g., 1) or the $OSS_{AVG}$ is not HI (e.g., 0). The first and second outputs are provided to the AND gate 330 and the load module 326.

The ignition failure detect module 314 determines whether the $LTM_{AVG}$ is LO and whether the $OSS_{AVG}$ is LO based on the output of the $LTM_{AVG}$ module 306 and the $OSS_{AVG}$ module 310. The ignition failure detect module 314 generates a first binary signal based on whether $LTM_{AVG}$ is LO (e.g., 1) or the $LTM_{AVG}$ is not LO (e.g., 0). The ignition failure detect module 314 generates a second binary signal based on whether $OSS_{AVG}$ is LO (e.g., 1) or the $OSS_{AVG}$ is not LO (e.g., 0). The first and second outputs are provided to the AND gate.

The OSS HI detect module 322 determines whether the OSS is HI based on the output of the $OSS_{AVG}$ module 310. The OSS HI detect module 322 generates a binary signal based on whether the OSS is HI (e.g., 1) or is not HI (e.g., 0). The output of the OSS HI detect module is provided to the AND gate 334. The RPM rate module 324 determines whether the RPM is decreasing based on the engine RPM. The RPM rate module 324 generates a binary signal based on whether the engine RPM is decreasing (e.g., 1) or is not decreasing (e.g., 0), which is provided to the AND gate 332. The load module 326 determines whether the engine load is HI. More specifically, the engine load is considered Hi if $LTM_{AVG}$ is neither HI nor LO (i.e., in a MID range) and $OSS_{AVG}$ is HI. The load module 326 generates a binary signal based on whether the engine load is HI (e.g., 1) or is not Hi (e.g., 0). The output of the load module 326 is provided to the AND gate 334.

The AND gate 328 generates a binary signal based on the inputs thereto. More specifically, the AND gate 328 generates a binary signal based on whether the fault source is lean fuel (e.g., 1) or is not lean fuel (e.g., 0). The AND gate 330 generates a binary signal based on the inputs thereto. More specifically, the AND gate 330 generates a binary signal based on whether the fault source is rich fuel (e.g., 1) or is not rich fuel (e.g., 0). Similarly, the AND gate 332 generates a binary signal based on whether the fault source is ignition failure (e.g., 1) or is not ignition failure (e.g., 0) and the AND gate 334 generates a binary signal based on whether the fault source is excess load (e.g., 1) or is not excess load (e.g., 0).

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An engine idle fault control system that identifies a source of rough idle in an engine, comprising:
   a first module that monitors an idle speed of said engine and that generates a rough idle signal;
   a second module that monitors a fuel control parameter; and
   a third module that determines a source of rough idle based on said fuel control parameter and said rough idle signal.

2. The engine idle fault control system of claim 1 wherein said third module sets a source flag based on said source of rough idle.

3. The engine idle fault control system of claim 1 wherein said third module determines said source to be an ignition failure when said fuel control parameter is less than a threshold parameter and said engine idle speed is decreasing.

4. The engine idle fault control system of claim 1 wherein said third module determines said source to be an excess load on said engine when said fuel control parameter varies and said engine idle speed is bouncing.

5. The engine idle fault control system of claim 4 wherein said third module determines said source to be said excess load when said fuel control parameter varies, said engine idle speed is bouncing and a mass air flow (MAF) into said engine is greater than a threshold MAF.

6. The engine idle fault control system of claim 1 further comprising a fourth module that monitors an oxygen sensor signal (OSS).

7. The engine idle fault control system of claim 6 wherein said third module determines said source to be a fuel lean condition when said fuel control parameter is greater than a threshold fuel control parameter, said engine idle speed is bouncing and said OSS is less than a threshold OSS.

8. The engine idle fault control system of claim 6 wherein said third module determines said source to be a fuel rich condition when said fuel control parameter is less than a threshold parameter, said engine idle speed is bouncing and said OSS is greater than a threshold OSS.

9. The engine fault control system of claim 1 wherein said fuel control parameter is a fuel control long-term multiplier (LTM).

10. A method of identifying a source of rough idle in an engine, comprising:
    monitoring an idle speed of said engine;
    selectively generating a rough idle signal based on said idle speed;
    monitoring a fuel control parameter; and
    identifying a source of rough idle based on said fuel control parameter and said rough idle signal.

11. The method of claim 10 further comprising setting a source flag based on said source of rough idle.

12. The method of claim 10 wherein said source is identified as an ignition failure when said fuel control parameter is less than a threshold parameter and said engine idle speed is decreasing.

13. The method of claim 10 wherein said source is identified as an excess load on said engine when said fuel control parameter varies and said engine idle speed is bouncing.

14. The method of claim 13 wherein said source is identified as said excess load when said fuel control parameter varies, said engine idle speed is bouncing and a mass air flow (MAF) into said engine is greater than a threshold MAF.

15. The method of claim 10 further comprising monitoring an oxygen sensor signal (OSS).

16. The method of claim 15 wherein said source is identified as a fuel lean condition when said fuel control parameter is greater than a threshold parameter, said engine idle speed is bouncing and said OSS is less than a threshold OSS.

17. The method of claim 15 wherein said source is identified as a fuel rich condition when said fuel control parameter is less than a threshold parameter, said engine idle speed is bouncing and said OSS is greater than a threshold OSS.

18. The method of claim 10 wherein said fuel control parameter is a fuel control long-term multiplier (LTM).

19. A method of identifying a source of rough idle in an engine, comprising:
    selectively generating a rough idle signal based on an idle speed of said engine;
    monitoring a fuel control long-term multiplier (LTM);
    monitoring an oxygen sensor signal (OSS); and
    identifying a source of rough idle based on said rough idle signal, said LTM and said OSS.

20. The method of claim 19 further comprising setting a source flag based on said source of rough idle.

21. The method of claim 19 wherein said source is identified as an ignition failure when said LTM is less than a threshold LTM, said engine idle speed is decreasing and said OSS is less than a threshold OSS.

22. The method of claim 19 wherein said source is identified as a fuel lean condition when said LTM is greater than a threshold LTM, said engine idle speed is bouncing and said OSS is less than a threshold OSS.

23. The method of claim 19 wherein said source is identified as a fuel rich condition when said fuel control parameter is less than a threshold parameter, said engine idle speed is bouncing and said OSS is greater than a threshold OSS.

24. The method of claim 19 further comprising monitoring a mass air flow (MAF) into said engine.

25. The method of claim 24 wherein said source is identified as said excess load when said LTM varies, said engine idle speed is bouncing and said MAF is greater than a threshold MAF.

* * * * *